United States Patent [19]
Beine et al.

[11] 3,963,563
[45] June 15, 1976

[54] BURST SHIELD FOR A PRESSURIZED NUCLEAR-REACTOR CORE AND METHOD OF OPERATING SAME

[75] Inventors: Burkhard Beine, Tonisvorst; Franz Schilling, Kempen, both of Germany

[73] Assignee: Siempelkamp Giesserei KG, Krefeld, Germany

[22] Filed: Feb. 11, 1974

[21] Appl. No.: 441,492

[30] Foreign Application Priority Data
Feb. 13, 1973 Germany............................ 2306959

[52] U.S. Cl................................. 176/19 R; 176/38; 176/87; 176/DIG. 2
[51] Int. Cl.²......................................... G21C 17/00
[58] Field of Search............. 176/37, 38, 87, DIG.2, 176/19

[56] References Cited
UNITED STATES PATENTS

| | | | |
|---|---|---|---|
| 3,158,546 | 11/1964 | Cordova | 176/DIG. 2 |
| 3,424,239 | 1/1969 | Coudray | 176/87 X |
| 3,489,206 | 1/1970 | Le Court | 176/87 X |
| 3,523,062 | 8/1970 | Brown | 176/87 X |
| 3,775,251 | 11/1973 | Schabert | 176/87 |
| 3,785,924 | 1/1974 | Notari | 176/87 X |

*Primary Examiner*—Stephen C. Bentley
*Assistant Examiner*—Peter A. Nelson
*Attorney, Agent, or Firm*—Karl F. Ross; Herbert Dubno

[57] ABSTRACT

A pressurized nuclear-reactor core stands on a base up from which extends a cylindrical side wall formed of a plurality of hollow iron castings held together by circumferential and longitudinal prestressed elements. A cylindrical space between this shield and the core serves for inspection of the core and is normally filled with cast-iron segmental slabs so that if the core bursts pieces thrown out do not acquire any dangerous kinetic energy before engaging the burst shield. The top of the shield is removably secured to the side so that it can be moved out of the way periodically for removal of the filler slabs and inspection of the core. An anchor on the upper end of each longitudinal prestressing element bears against a sleeve pressing against the uppermost side element, and a nut engageable with this anchor is engageable down over the top to hold it in place, removal of this nut leaving the element prestressed in the side wall.

11 Claims, 16 Drawing Figures

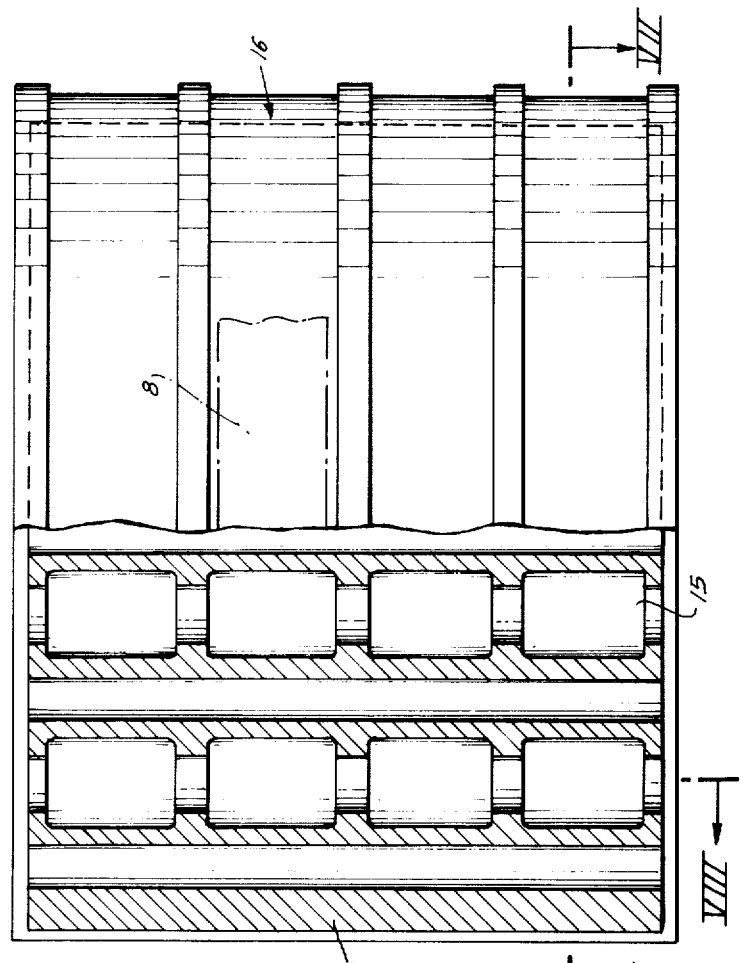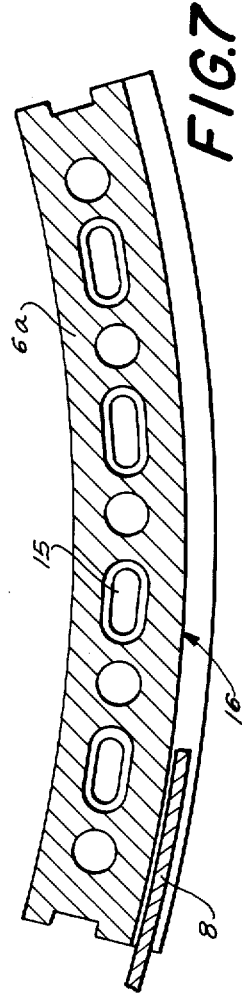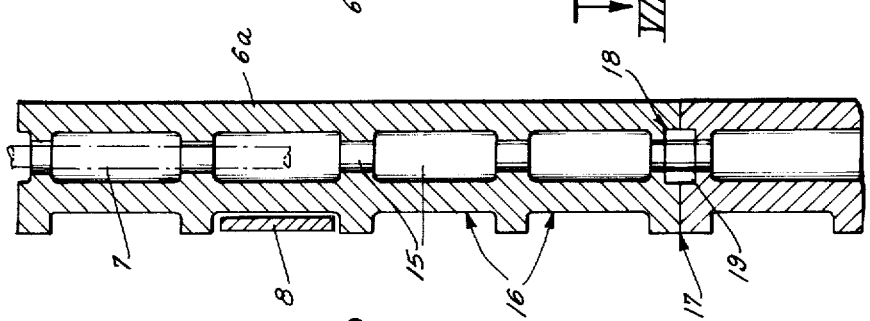

BURST SHIELD FOR A PRESSURIZED NUCLEAR-REACTOR CORE AND METHOD OF OPERATING SAME

FIELD OF THE INVENTION

The present invention relates to a burst shield for a nuclear-reactor core. More particularly this invention concerns such a shield for a pressurized reactor core and a method of inspecting such a core.

BACKGROUND OF THE INVENTION

Pressurized-water, boiling-water, and pressurized-gas nuclear reactors have a core in which considerable pressure is contained, as discussed in the commonly assigned U.S. Pat. No. 3,734,827 issued May 22, 1973 to Franz SCHILLING for a NUCLEAR-REACTOR STRUCTURE.

Bursting of such a core presents a grave peril for any persons or structure nearby. Not only can such cores burst or explode with considerable force, sending fragments outwardly at high speed, but they can project radioactive materials and liquids outwardly to render the surroundings unusably radioactive.

It is therefore necessary to provide for this possibility of bursting by surrounding the core with a shield which acts as a simple physical barrier between the core and the outside. As a general rule this has been accomplished through the simple, but expensive and bulky, expedient of casting thick concrete walls all around the core.

The core must be checked periodically for faults or developing cracks. To do this inspection it is necessary to pass an ultrasonic, transducer or the like over the surface of the core while taking readings to ascertain if its surface is in good condition. Thus it is necessary to provide an inspection cavity all around the core between it and the burst shield. For this reason it is necessary to build the shield stronger and thicker than would be necessary if it could lie directly against the outside of the core, since the outwardly projected fragments of a bursting core have a high kinetic energy.

OBJECTS OF THE INVENTION

It is therefore an object of the present invention to provide an improved burst shield for a nuclear-reactor core.

Another object is the provision of a relatively inexpensive burst shield for, and a method of inspecting the core.

A further object is to provide a nuclear-reactor core burst shield which is of relatively light construction but which is strong enough to contain completely a bursting core.

SUMMARY OF THE INVENTION

These objects are attained according to the present invention by surrounding the core with a shield having a closed side wall made of cast-iron elements which are secured together by prestressing means as in the above-cited patent. This shield is spaced from the core to leave an inspection room or cavity which is filled in normal use with further cast-iron elements. The top at least of the shield is removably secured over the side walls to cover the core. Removal of this top allows the filler elements in the inspection cavity to be removed to permit electronic inspection of the core wall.

Since the inspection cavity is normally filled, kinetic energy that can be developed in a bursting core is reduced greatly. Thus the core is periodically examined by depressurization of the core and then removal of the top and the filler elements so that the head of an ultrasonic tester or the like can be inserted between the core and the shield.

In accordance with another feature of this invention the top is held on by means of releasable clamps on the side wall. These clamps according to this invention are carried on the ends of longitudinal reinforcing/prestressing rods passing upwardly through the side wall of the shield. The rods remain prestressed in the side wall whether or not the top is in place. This is achieved by prestressing the top anchor of at least some of the rods against sleeves which bear down on the stack of elements forming the side walls. The top fits over these sleeves so that the anchors project above the top when it is in place. Nuts screwed over the projecting anchors bear through spacer elements on the top to prestress the entire assembly together.

All of the construction elements are hollow iron castings which are held together by steel prestressing rods and bands. Such a structure is extremely strong while being relatively light. The elements filling the inspection cavity transmit forces in the core evenly to the shield so that the core is completely contained should it burst. Indeed such a shield prevents bursting of the core by buttressing its sides, and can even be provided with internal passages through which water is passed to cool the core.

The method according to the present invention comprises the steps of completely filling the inspection cavity between the burst shield and the reactor during normal operation thereof with rigid cast-iron bodies, then removing the top of the shield and these bodies and introducing a testing device into the cavity. In this manner it is possible to inspect the core easily.

BRIEF DESCRIPTION OF THE DRAWING

The above and other objects, features, and advantages of the invention will become more readily apparent from the following description, reference being made to the accompanying drawing in which:

FIG. 1A is a perspective view of a filler body;

FIG. 6 is an enlarged scale elevational view partly in section taken in the direction of arrow VI of FIG. 1;

FIGS. 7 and 8 are sections taken along lines VII—VII and VIII—VIII, respectively, of FIG. 6;

SPECIFIC DESCRIPTION

Figure 1:
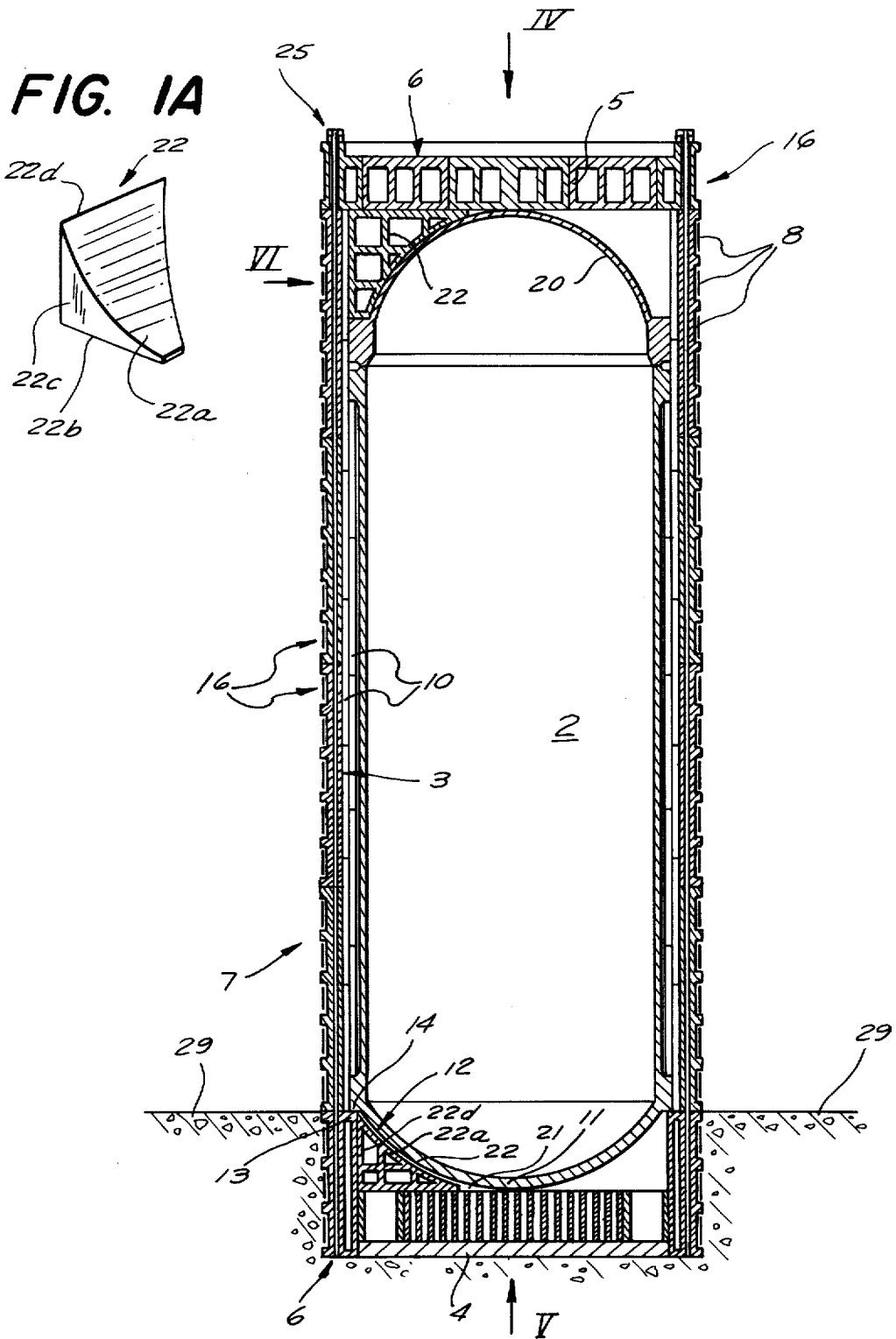
FIG. 1 is a vertical section through a burst shield surrounding a pressurized nuclear-reactor core.
Figure 10:
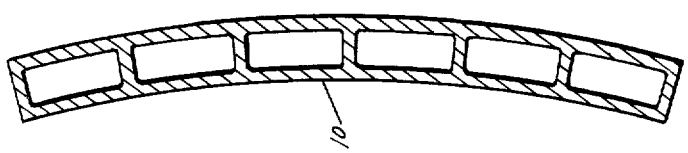
FIGS. 10 and 11 are sections taken along respective lines X—X and XI—XI of FIG. 9.
Figure 9:
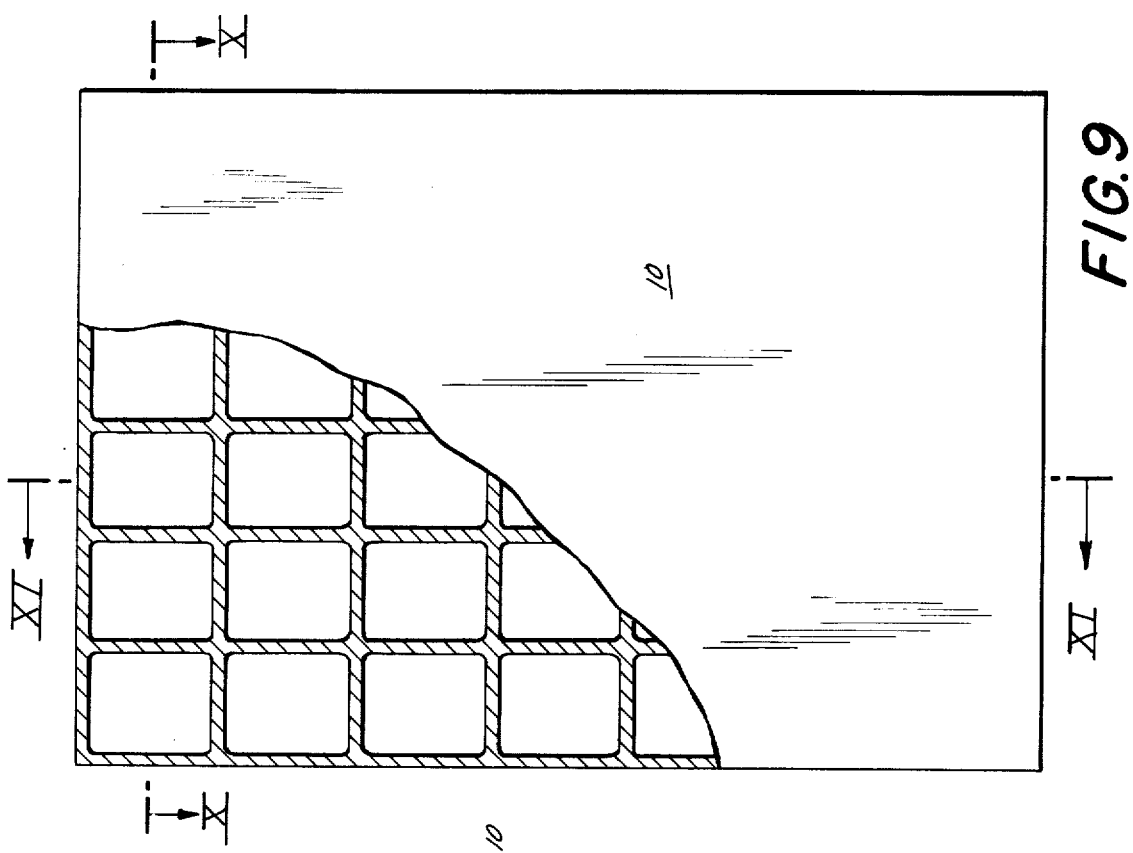
FIG. 9 is an enlarged-scale elevational view partly in section taken in the direction of arrow IX of FIG. 1.
Figure 11:
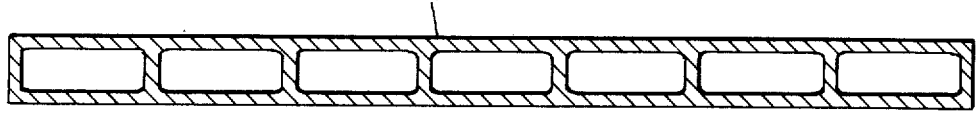

FIG. 1 shows a burst shield 1 for a pressurized nuclear reactor core 2 of generally cylindrical shape having upper and lower hemispherically convex ends 20 and 11. The shield 1 has a cylindrical body 3 and a base 4 as well as a top 5, all formed of hollow cast-iron elements 6 held together by longitudinally extending steel reinforcement rods 7 and circumferential steel reinforcing bands 8. Between the body 3 of the shield 1 and the corresponding body of the core 2 is a cylindrical inspection cavity 9 normally filled with two layers of cylindrically segmental slabs 10 formed as ribbed-iron castings as shown in detail in FIGS. 9–11. These slabs 10 are hollow castings arranged in two cylindrical layers to fill the cavity 9 completely and thereby transmit force from the core 2 to the shield 1.

Figure 5:
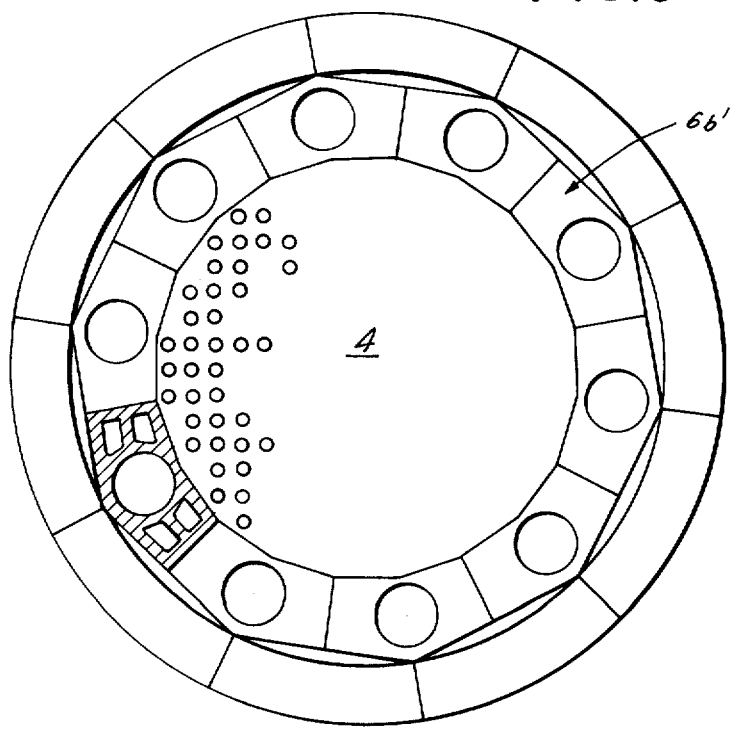

Between the base 11 of the core 2 and the base 4 of the shield 1 is a hemispherical inspection cavity 12. The base forms an annular support ledge 13 on which a shoulder 14 of the core 3 rests. The entire base of the assembly here is sunk in a concrete floor 29 so that the impact caused by a bursting of the core 2 is easily absorbed even without completely filling the space between the core base 11 and the bottom plate 4. This space is filled, however, with the exception of cavity 12 with filler blocks 22 shown in FIG. 1A. Each block 22 is of segmental shape with one convex, partly spherical face 22a, a planar face 22b adapted to lie on the base plate 4, two side surfaces 22c which lie against similar surfaces of similar blocks and which extend radially to the central axis A of the assembly, and an outer part-cylindrical surface 22d which lies against the blocks 6a forming the side walls of the shield 1. The bottom plate 4 is formed basically of segmental blocks 6b' as shown in FIG. 5 which accommodate the control rods of the reactor. Blocks 6b' and 22 are hollow iron castings of considerable strength.

The walls of the shield 1 are formed of part-cylindrical slabs 6a which are, once again, hollow iron castings as shown in FIGS. 6–8. Axially throughgoing passages 15 serve to accommodate the axial reinforcement bars 7, and grooves 16 in the side receive the circumferential prestressing straps 8. The slabs 6a are formed at some of their passages 15 with counterbores 19 in which short steel sleeves 18 are positioned so that the two flat faces 17 of these slabs 6a are aligned exactly. It is also possible to position bands in grooves between these faces 17. The axially extending edges of the grooves can interfit as described in the above-cited patent. It is possible to calk these slabs 6a and run coolant through the passages in them.

Figure 4:
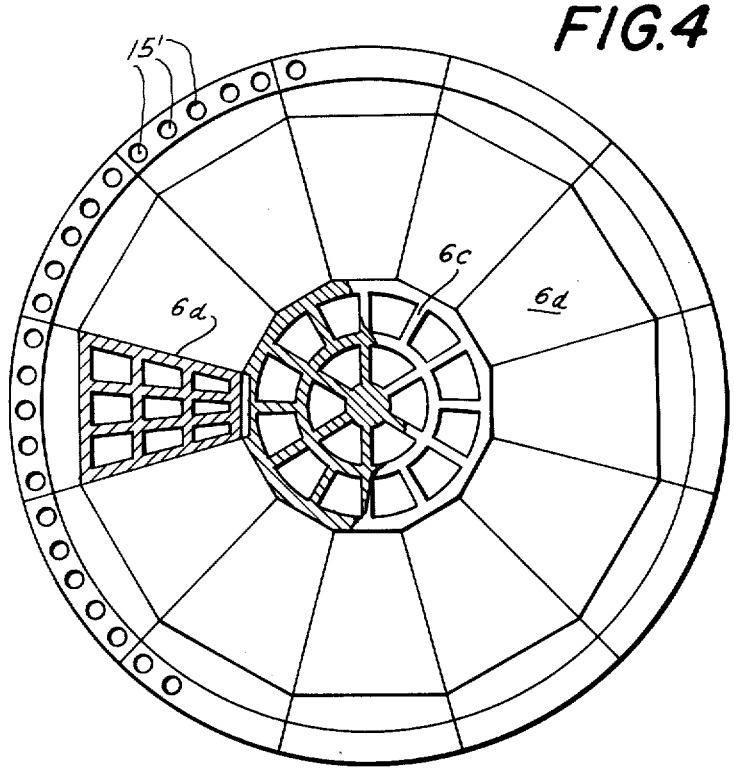
FIGS. 4 and 5 are views partly in section taken in the directions of respective arrows IV and V of FIG. 1.

The top plate shown in FIG. 4 comprises twelve outer segmental blocks 6b formed with holes 15' which are anigned with the holes 15 in the blocks 6a so that the reinforcement elements 7 can pass up through them.

Figure 2:
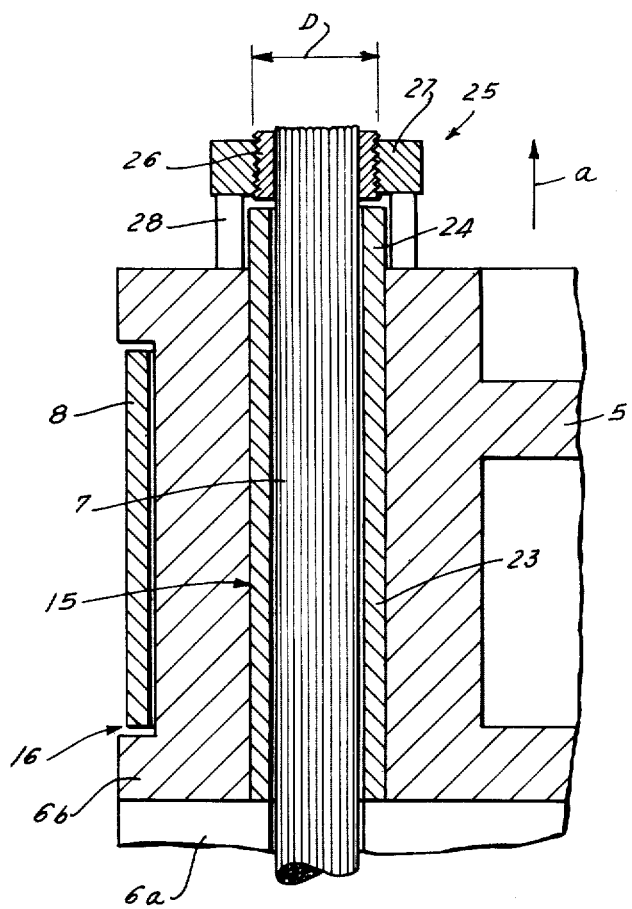
FIG. 2 is an enlarged-scale view of a detail of FIG. 1.

A central plate 6c is held in place by the interposition of twelve further blocks 6d which are all formed as hollow iron castings which are heavily ribbed for maximum strength as are the elements 6b' and 6a. A band 8 surrounds the entire top plate 5 as shown in FIG. 2.

Each hole 15' is lined with a rigid sleeve 23 in which has one end abutting the underlying slab 6a and another end 24 projecting from the top of the block 6b.

Figure 3:
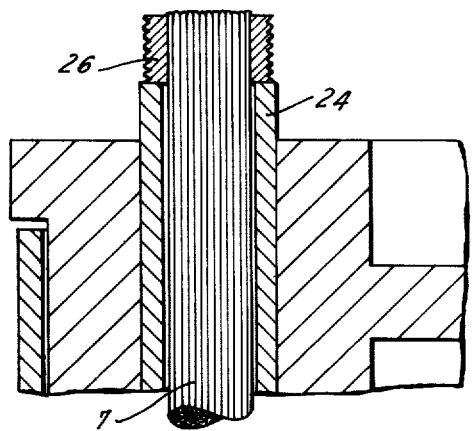
FIG. 3 is a view similar to FIG. 2 illustrating another position of the top clamp of this invention.
Figure 12:
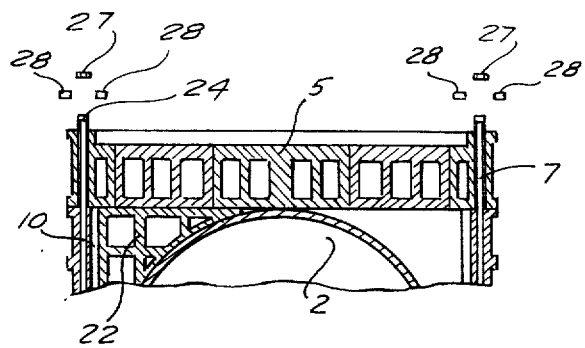
FIGS. 12–15 are elevational sectional views partly in diagrammatic form illustrating the method of this invention.
Figure 13:
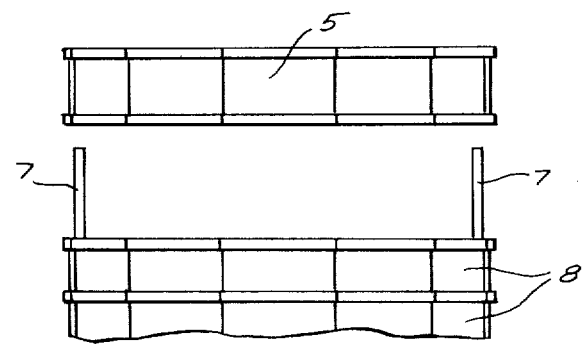
Figure 14:
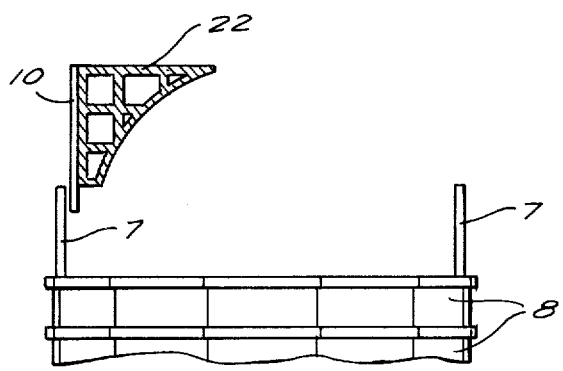
Figure 15:
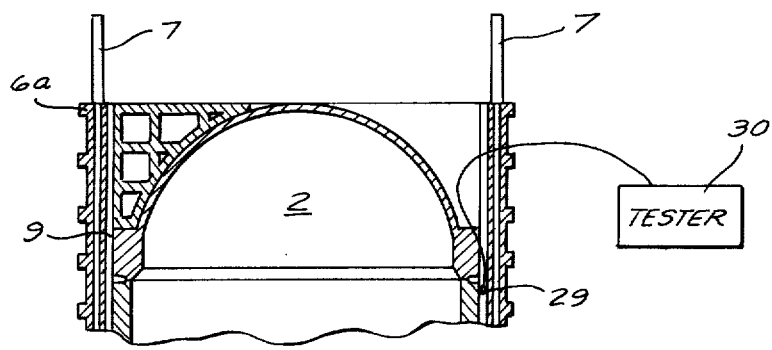

The reinforcement bar or bars 7 extend axially through this sleeve 23 and have their upper ends secured in an anchor or nut 26 which has an outer diameter D greater than the inner diameter of the sleeve 23 but less than its outer diameter. Thus, as shown in FIGS. 3, and 12 when the anchor 26 lies against the end 24 with the elements 7 under tension so as to be prestressed it exerts no force on the top 5. This allows the entire plate 5 to be removed in the direction of arrow a as shown in FIG. 13 without destressing the elements 7. Once the cover is removed the filler blocks 22 under it, which lie snugly on top of the upper end 20 of the core 2, and the slabs 10 can be removed as seen in FIG. 14 to give free access to the entire inspection room or cavity 9. A head 29 of an ultrasonic tester 30 can then be introduced into the space 9 as shown in FIG. 15.

After inspection, the cover 5 is set in place again over the sleeves 23 and semicylindrical blocks 28 are placed around each end 24, then a nut 27 is screwed down over the anchor 26 so as to lock the top plate 5 in place and further prestress the elements 7. This therefore forms a holding arrangement 25 which allows the top plate 5 to be removed without destressing the assembly.

It is of course within the scope of the invention to make the bottom plate similarly removable, and other means for locking the end plates over the assembly, such as hydraulically actuated clamps are also envisaged. The principle involved here is the shielding of a pressurized nuclear-reactor core by means of a plurality of cast-iron elements which are so arranged that the inspection cavity does not allow any fragments moving outwardly from a bursting core to attain sufficient kinetic energy to rupture the shield. In this manner it is possible to build a relatively thin shield which completely protects the surrounding personnel and structures, and which contains any potentially dangerous radioactivity.

We claim:
1. A burst shield for a pressurized nuclear-reactor core, said shield comprising:
 a base underneath said core;
 a closed side wall extending upwardly from said base and spacedly surrounding said core, said wall being formed of a plurality of cast-iron elements and a plurality of elongated prestressing members under tension securing said elements together;
 a top removably engaged with said wall over said core;
 means for releasably securing said top to said wall over said core; and
 a plurality of cast-iron filler bodies in the space between and engaging said wall and said core.

2. The shield defined in claim 1 wherein said wall is generally cylindrical and upright, said members including elongated members extending longitudinally along said wall and elongated members circumferentially engaging said elements.

3. The shield defined in claim 2 wherein said elements and said bodies are hollow iron castings.

4. The shield defined in claim 3 wherein said space between said wall and said core is generally cylindrically annular, said bodies being slabs shaped as segments of a cylindrical annulus.

5. The shield defined in claim 4 wherein said bodies are arranged in two overlying layers in force-transmitting contact with said wall and with said core.

6. The shield defined in claim 4 wherein said means includes anchors at the upper ends of at least some of the longitudinally extending members and means for securing said anchors to said top.

7. The shield defined in claim 6 wherein said means for securing said top to said wall includes a sleeve between each of said anchors and said wall, said top being formed with throughgoing holes receiving said anchors, and said means for securing said anchors to said top including respective nuts threadedly engaged with respective anchors and with said top, said nuts securing said top to said wall.

8. The shield defined in claim 7, wherein said sleeves have a length substantially greater than the thickness of said top at said holes, said means for securing said anchors to said top including at least one force-transmitting body between each of said nuts and said top.

9. The shield defined in claim 4 wherein said top is formed of a plurality of hollow cast-iron bodies and at least one prestressing member circumferentially surrounding same.

10. The shield defined in claim 4 wherein said elements are all shaped as segments of a cylindrical annulus.

11. A method of operating a nuclear reactor comprising the steps of:
  filling an inspection space between a core of the reactor and a burst shield surrounding said core with a plurality of cast-iron slabs during normal operation of said reactor;
  removing the top of said shield and withdrawing said slabs from said space to empty same for inspection thereof; and
  introducing an inspection tool into the empty space.

* * * * *